US012192353B2

(12) United States Patent
Pruss et al.

(10) Patent No.: US 12,192,353 B2
(45) Date of Patent: Jan. 7, 2025

(54) MULTI-NODE EXPANDABLE CRYPTOGRAPHIC PROCESSING SYSTEM

(71) Applicant: MOTOROLA SOLUTIONS, INC., Chicago, IL (US)

(72) Inventors: Brian W. Pruss, Streamwood, IL (US); Amalendu Roy, Buffalo Grove, IL (US); Brent A. Veltkamp, Streamwood, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 239 days.

(21) Appl. No.: 18/060,159

(22) Filed: Nov. 30, 2022

(65) Prior Publication Data

US 2024/0179000 A1   May 30, 2024

(51) Int. Cl.
*H04L 29/06* (2006.01)
*H04L 9/08* (2006.01)

(52) U.S. Cl.
CPC .......... *H04L 9/0897* (2013.01); *H04L 9/0877* (2013.01); *H04L 2209/12* (2013.01)

(58) Field of Classification Search
CPC . H04L 9/0897; H04L 9/0877; H04L 2209/12; H04L 9/0822; H04L 9/0825; H04L 9/3263
See application file for complete search history.

(56) References Cited

U.S. PATENT DOCUMENTS

| 9,660,970 | B1 | 5/2017 | Rubin et al. |
| 10,554,392 | B2 | 2/2020 | Rubin et al. |
| 11,140,140 | B2 | 10/2021 | Norum |
| 2015/0358161 | A1* | 12/2015 | Kancharla ............. H04L 9/3234 713/164 |
| 2016/0028539 | A1* | 1/2016 | Su ............................ H04L 9/32 713/171 |
| 2016/0036854 | A1* | 2/2016 | Himawan ............... H04L 63/04 726/5 |
| 2018/0349618 | A1* | 12/2018 | Biehlmann ........ G06Q 20/3823 |
| 2020/0322139 | A1 | 10/2020 | Hersans et al. |

FOREIGN PATENT DOCUMENTS

KR   20080054792 A   6/2008

* cited by examiner

*Primary Examiner* — William A Corum, Jr.
(74) *Attorney, Agent, or Firm* — Michael Best & Friedrich LLP

(57) ABSTRACT

A system for securely managing a plurality of hardware security modules (HSMs). One example provides a host device, a first HSM, and a second HSM. The host device is configured to designate the first HSM as a primary HSM, and activate a security association mode in the primary HSM. The first HSM is configured to generate a multi-HSM exchange key ("MEK"), and encrypt the MEK using a temporary key generated with a key agreement protocol between the first HSM and the second HSM. The first HSM shares the encrypted MEK with the second HSM via the host device. The host device deactivates the security association mode, and the first HSM receives a traffic encryption key ("TEK"). The first HSM encrypts the TEK using the MEK, and shares the encrypted TEK with the second HSM via the host device. The second HSM decrypts the TEK using the MEK.

20 Claims, 11 Drawing Sheets

MULTI-NODE EXPANDABLE CRYPTOGRAPHIC PROCESSING SYSTEM

BACKGROUND

Encryption is important to securing communications, for example, communication among public safety personnel. Some cryptographic processing applications, such as applications used in public safety dispatch centers, require higher processing throughput. For example, a cryptographic processing application may be required to encrypt and decrypt multiple communication streams simultaneously. Such processes increase the capacity needs of a hardware security module.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features that include the claimed subject matter, and explain various principles and advantages.

Figure 1:
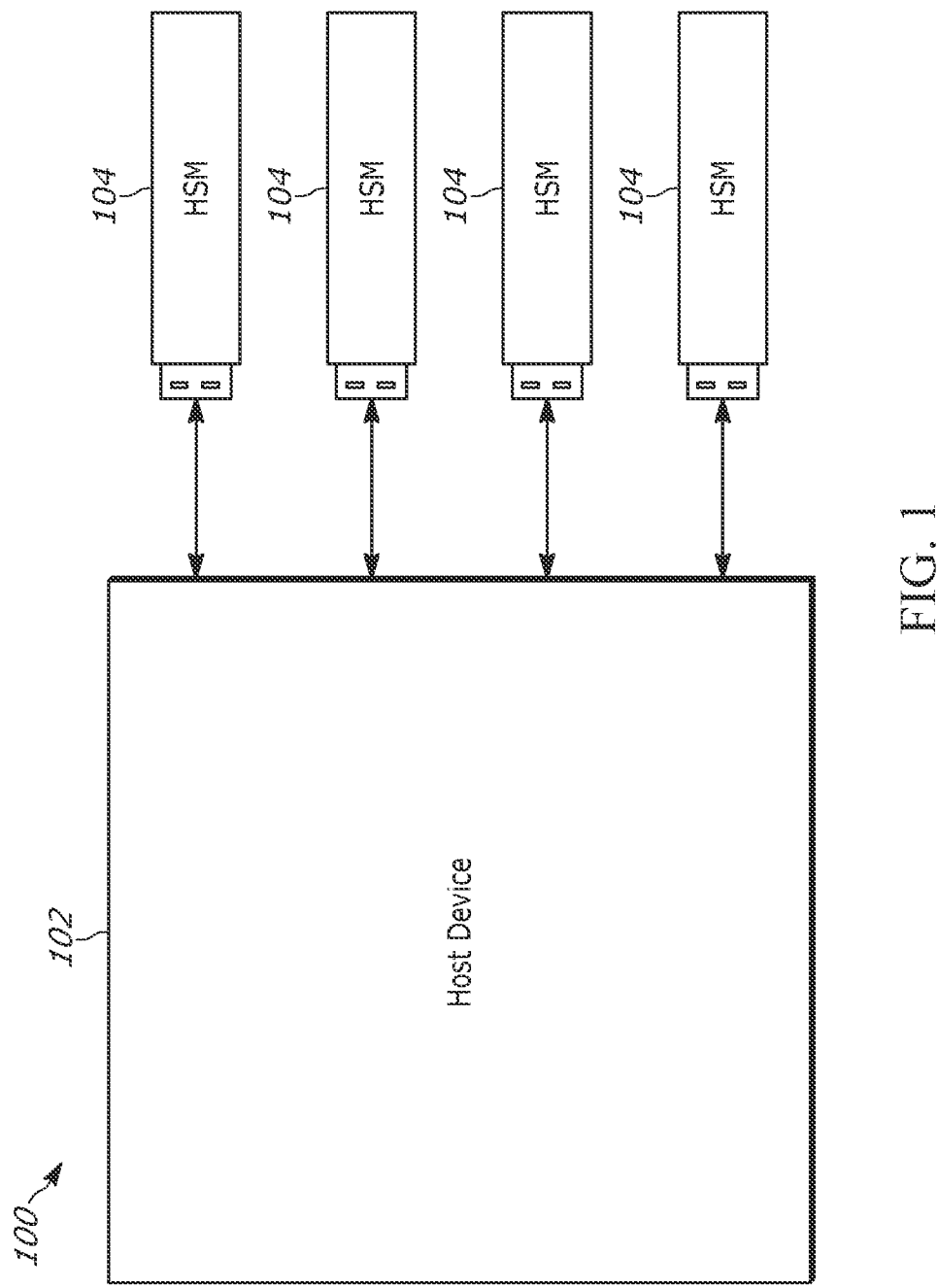
FIG. 1 illustrates a multi-node cryptographic processing system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding the embodiments, examples, aspects, and features described and illustrated so as not to obscure the disclosure with details that will be readily apparent to those of ordinary skill in the art having the benefit of the description herein.

DETAILED DESCRIPTION

Cryptographic keys are used, among other things, to secure communications between a dispatch console and one or more communication devices (e.g., land mobile radios) of public safety personnel. For example, encryption and decryption of communication streams may be performed using shared secret keys between communication devices and/or a dispatch console.

To streamline communication, personnel may be assigned to different communication groups (sometimes referred to as "talkgroups" or "channels"). Dispatchers coordinating an incident response utilize multiple software applications and communicate with personnel participating in multiple talkgroups, which may span multiple agencies (e.g., fire department, SWAT, police department, etc.). Each talkgroup may be associated with one or more keys (e.g., a traffic encryption key). Traffic encryption keys, or TEKs, are keys used to encrypt and/or decrypt information between communication devices of a talkgroup. These traffic encryption keys are updated periodically and managed by a hardware security module ("HSM") that performs encryption and decryption of communication streams. The management of keys used by talkgroups is important for a number of reasons. For example, it may be desirable to change keys periodically to make unauthorized access or interception of communications less successful. Management of key material may also involve coordination between disparate communication systems owners (or operators).

Some applications require higher processing throughput than can be achieved with a single HSM. For example, a dispatch console may be responsible for encrypting and decrypting multiple audio streams simultaneously. Additionally, a dispatch console may receive an encrypted communication stream from a first communication device, and may need to decrypt the communication stream using a first traffic encryption key, encrypt the communication stream using a second traffic encryption key, and patch or route the re-encrypted communication stream to a second communication device. Such processes contribute to the capacity needs of an HSM.

In instances where a single HSM, or "node," is insufficient to handle such processing throughput, cryptographic processing capacity may be expanded by using multiple HSMs in the communication system. Traditionally, in systems that rely on multiple HSMs, traffic encryption keys are managed separately by each HSM, which may result in the occurrence of key management errors. For example, traffic encryption keys may be updated asynchronously across HSMs. In such instances, if an encrypted communication stream is assigned to an HSM which has not received an updated traffic encryption key, decryption of the communication stream may fail. Alternatively, purpose-made HSM processing units may utilize a separate connection between HSMs in the processing unit to share key material. However, the processing capacity of these processing units is not expandable as processing needs change in a system. Additionally, pathways between HSMs in the processing unit may leave sensitive key material exposed.

To address, among other things, these problems, systems and methods are provided herein for a multi-node expandable cryptographic processing system. Among other things, examples described herein provide a system for securely managing a plurality of hardware security modules (HSMs) each including a memory and an electronic processor. The system includes a first HSM, a second HSM, and a host device. The host device includes a host memory and an electronic processor and is configured to designate the first HSM as a primary HSM, designate the second HSM as a subordinate HSM, and activate a security association mode. The first HSM is configured to, in response to the security association mode being activated, generate a multi-HSM exchange key. Using a temporary key generated with a key agreement protocol between the first HSM and the second HSM, the first HSM encrypts the multi-HSM exchange key using the temporary key, and shares an encrypted multi-HSM exchange key with the second HSM via the host device. The host device is further configured to, in response to the first HSM sharing the encrypted multi-HSM exchange key with the second HSM, deactivate the security association mode. The first HSM is further configured to receive a traffic encryption key (TEK) and, in response to receiving the TEK, notify the host device of having received the TEK. The host device is further configured to transmit a request to the first HSM to encrypt the TEK using the multi-HSM exchange key, receive an encrypted TEK from the first HSM, store the encrypted TEK in the host memory, and provide the encrypted TEK to the second HSM. The second HSM is configured to invalidate or erase the TEK upon completion of a processing session.

Another example provides a primary hardware security module (HSM) used in a system for securely managing a plurality of HSMs. The primary HSM comprises a memory and an electronic processor configured to, in response to receiving a request from a host device to enter a security association mode, enter the security association mode. In response to receiving a request from the host device to generate a multi-HSM exchange key while in the security association mode, the electronic processor generates the multi-HSM exchange key. Using a temporary key generated using a key agreement protocol, the electronic processor encrypts the multi-HSM exchange key and shares an encrypted multi-HSM exchange key with a subordinate HSM via the host device.

Another example provides a host device used in a system for securely managing a plurality of hardware security modules (HSMs). The host device comprises a memory and an electronic processor configured to designate a first HSM as a primary HSM, designate a second HSM as a subordinate HSM, receive an encrypted multi-HSM exchange key, provide the encrypted multi-HSM exchange key to the subordinate HSM, and deactivate the security association mode in the first HSM. The electronic processor receives an encrypted traffic encryption key (TEK) from the first HSM, the TEK being encrypted with the multi-HSM exchange key. The electronic processor stores the encrypted TEK in the memory and provides the encrypted TEK to the second HSM.

Another example provides a method for securely managing a plurality of hardware security modules (HSMs) each including a memory and an electronic processor. The method includes designating, with a host device, a first HSM as a primary HSM, designating a second HSM as a subordinate HSM, and activating a security association mode. The method also includes, in response to the security association mode being activated, generating, with the first HSM, a multi-HSM exchange key, generating a temporary key using a key agreement protocol between the first HSM and the second HSM, encrypting the multi-HSM exchange key using the temporary key, and sharing the encrypted multi-HSM exchange key with the second HSM via the host device. The method further includes, in response to sharing the encrypted multi-HSM exchange key with the second HSM, deactivating the security association mode, receiving a traffic encryption key (TEK), and notifying the host device of having received the TEK. The method further includes transmitting, with the host device, a request to the first HSM to encrypt the TEK using the multi-HSM exchange key, receiving an encrypted TEK from the first HSM, storing the encrypted TEK in the host memory, and providing the encrypted TEK to the second HSM. The method also includes invalidating or erasing, with the second HSM, the TEK upon completion of a processing session.

For case of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should be understood that although certain figures presented herein illustrate hardware and software located within particular devices, these depictions are for illustrative purposes only. In some examples, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 illustrates an example multi-node cryptographic processing system 100. The system 100 includes a host device 102 and a plurality of a hardware security modules ("HSMs") 104. The host device 102 is a computer computing device residing in a call dispatch center and communicatively connectable to each of the plurality of HSMs 104. The HSMs 104 are computing devices that perform cryptographic processing such as, for example, encryption, decryption, and cryptographic key management. In the illustrated example, the HSMs 104 are communicatively connectable to the host device 102 via a local bus such as, for example, a universal serial bus ("USB"). In some instances, components of the HSMs 104 are connectable to the host device 102 in a distributed configuration (e.g., via the cloud). In the illustrated example, the system 100 includes four HSMs 104. However, the number of HSMs 104 is not limited to four, and systems with a different number of HSMs 104 are possible. For example, the system 100 may include two HSMs 104, three HSMs 104, five HSMs 104, etc. Additionally, HSMs 104 may be removed or added to the system 100 as the processing needs of the system 100 change.

Figure 2:
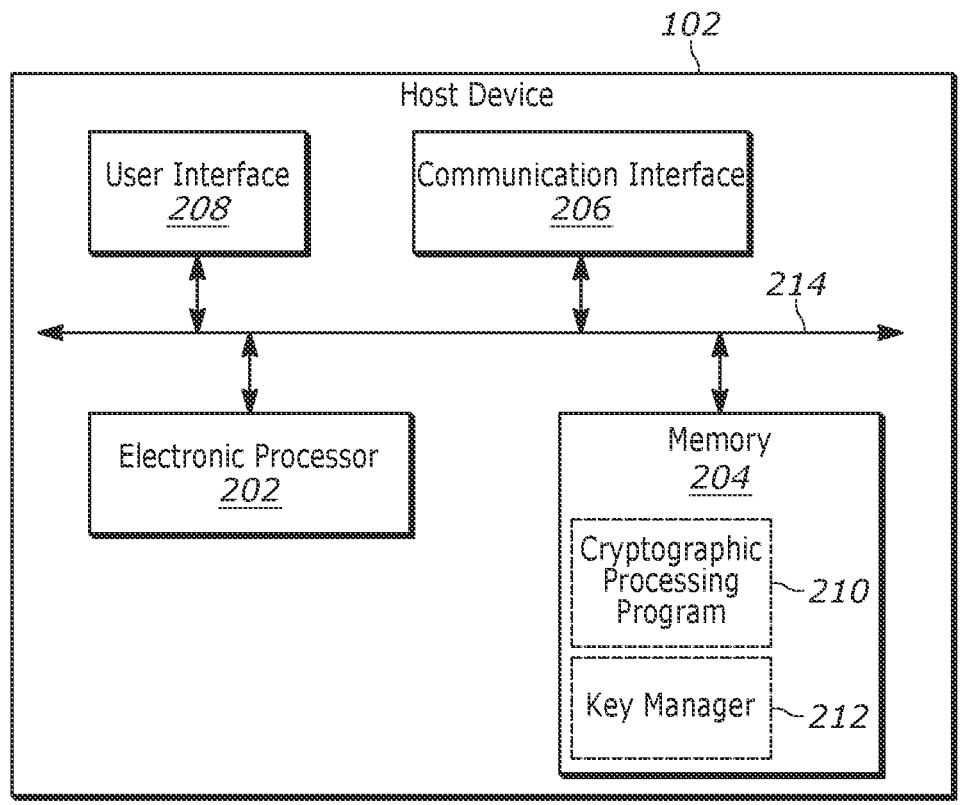
FIG. 2 schematically illustrates a host device of the system of FIG. 1, according to some examples.

FIG. 2 schematically illustrates the host device 102 according to some examples. In the example illustrated, the host device 102 includes an electronic processor 202, a memory 204, a communication interface 206, and a user interface 208. The electronic processor 202, the memory 204, the communication interface 206, and the user interface 208 communicate over one or more control and/or data buses (for example, a communication bus 214). In some examples, the host device 102 is a computer server. FIG. 2 illustrates only one example of a host device 102. The host device 102 may include fewer or additional components and may perform functions other than those explicitly described herein.

In some instances, the electronic processor 202 is implemented as a microprocessor with separate memory, for example, the memory 204. In other instances, the electronic processor 202 may be implemented as a microcontroller (with memory 204 on the same chip). In other instances, the electronic processor 202 may be implemented using multiple processors. In addition, the electronic processor 202 may be implemented partially or entirely as, for example, a field-programmable gate array (FPGA), and application specific integrated circuit (ASIC), and the like and the memory 204 may not be needed or be modified accordingly. In the example illustrated, the memory 204 includes non-transitory, computer-readable memory that stores instructions that are received and executed by the electronic processor 202 to carry out functionality of the host device 102 described herein. The memory 204 may include, for example, a program storage area and a data storage area. The program storage area and the data storage area may include combinations of different types of memory, for example, read-only memory and random-access memory. In the example illustrated, the memory 204 stores, among other things, a cryptographic processing program 210 and a key manager 212 which are used to implement the example methods for cryptographic processing described in greater detail below with reference to FIGS. 4-12.

The communication interface 206 sends and receives communications to and from the host device 102 and other components of the system 100, for example, the plurality of HSMs 104.

The user interface 208 may include one or more input devices (for example, a touch screen, a keypad, buttons, knobs, and the like), one or more output devices (for example, a display, a printer, a speaker, and the like), or a combination thereof. The user interface 208 receives input from input devices actuated by a user and provides output to output devices with which the user interacts. In some instances, as an alternative or in addition to managing inputs and outputs through the user interface 208, the host device 102 may receive user input, provide user output, or both by communicating with an external device, for example, a console computer, over a wired or wireless connection.

Figure 3:
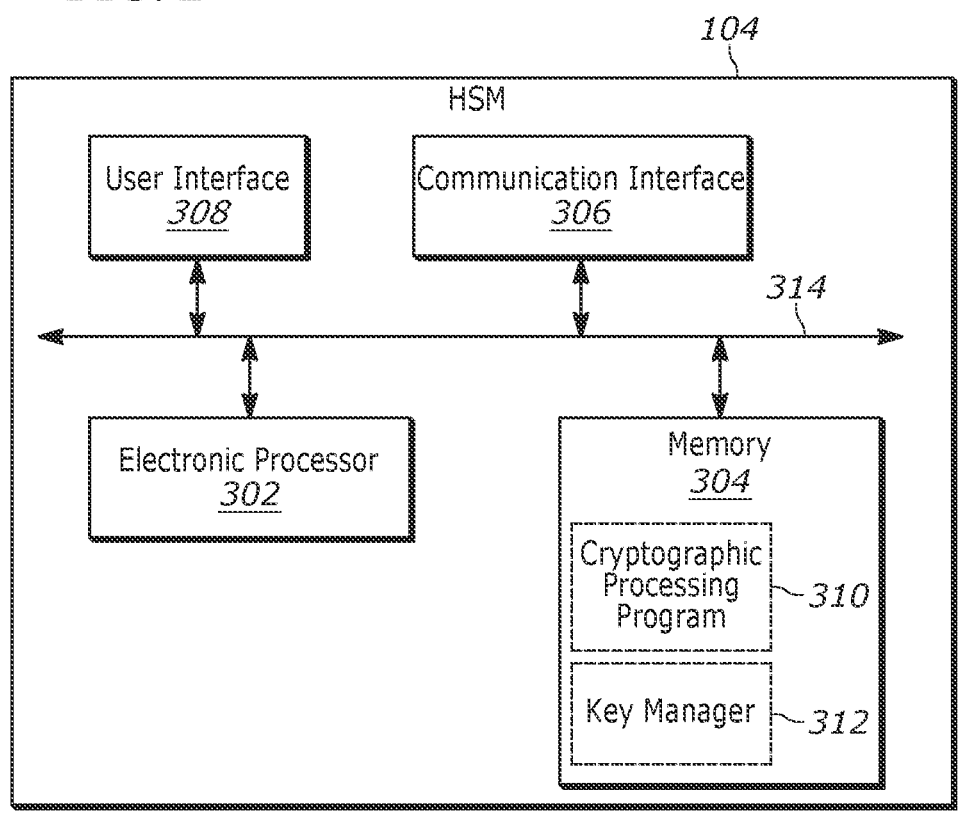
FIG. 3 schematically illustrates a hardware security module of the system of FIG. 1, according to some examples.

FIG. 3 schematically illustrates an HSM 104 according to some examples. The HSM 104 includes an electronic processor 302 (e.g., a cryptoprocessor), a memory 304, a communication interface 306, and a user interface 308. The electronic processor 302, the memory 304, the communication interface 306, and the user interface 308 communicate over one or more control and/or data buses (for example, a communication bus 314). FIG. 3 illustrates only one example of an HSM 104. The HSM 104 may include fewer or additional components and may perform functions other than those explicitly described herein.

In some examples, the electronic processor 302 is implemented as a microprocessor with separate memory, for example, the memory 304. In other examples, the electronic processor 302 may be implemented as a microcontroller (with memory 304 on the same chip). In other examples, the electronic processor 302 may be implemented using multiple processors. In some instances, the electronic processor 302 includes a plurality of electronic processors (e.g., a plurality of cryptoprocessors). In addition, the electronic processor 302 may be implemented partially or entirely as, for example, a field-programmable gate array (FPGA), and application specific integrated circuit (ASIC), and the like and the memory 304 may not be needed or be modified accordingly. In the example illustrated, the memory 304 includes non-transitory, computer-readable memory that stores instructions that are received and executed by the electronic processor 302 to carry out functionality of the HSM 104 described herein. The memory 304 may include, for example, a program storage area and a data storage area. The program storage area and the data storage area may include combinations of different types of memory, for example, read-only memory and random-access memory. In the example illustrated, the memory 304 stores, among other things, a cryptographic processing program 310 and a key manager 312 which are used to implement the example methods for cryptographic processing described in greater detail below with reference to FIGS. 3-10.

The communication interface 306 sends and receives communications to and from the HSM 104 and the host device 102. Each of the HSMs 104 are configured to share information with each other via the host device 102.

The user interface 308 may include one or more input device (for example, a touch screen, a keypad, buttons, knobs, and the like), one or more output devices (for example, a display, a printer, a speaker, and the like), or a combination thereof. The user interface 308 receives input from input devices actuated by a user and provides output to output devices with which the user interacts. In some instances, as an alternative or in addition to managing inputs and outputs through the user interface 308, the HSM 104 may receive user input, provide user output, or both by communicating with an external device, for example, the host device 102.

As described above, communication pathways between HSMs present a risk of security vulnerabilities when sensitive key material is shared between the HSMs via the communication pathways. To mitigate this risk, each of the plurality of HSMs 104 are configured to store, in persistent and/or non-volatile memory, a single multi-HSM exchange key ("MEK") that is the same for all HSMs 104 in the system 100. One of the plurality of HSMs 104 is designated as a primary HSM, and the others of the plurality of HSMs 104 are designated as subordinate HSMs. While the primary HSM and the subordinate HSMs 404 are substantially the same in structure in certain examples, the primary HSM operates as a single endpoint for key management in the system 100. For example, all updates to key material (e.g., TEKs, the MEK) are delivered to and managed by the primary HSM. Rather than directly sharing the TEKs with the subordinate HSMs via the host device 102, the primary HSM encrypts each of the TEKs using the MEK before providing the encrypted MEK to the host device 102. The subordinate HSMs receive the encrypted TEK from the host device 102, and decrypt the TEK using the MEK for use in a cryptographic processing session.

Figure 4:
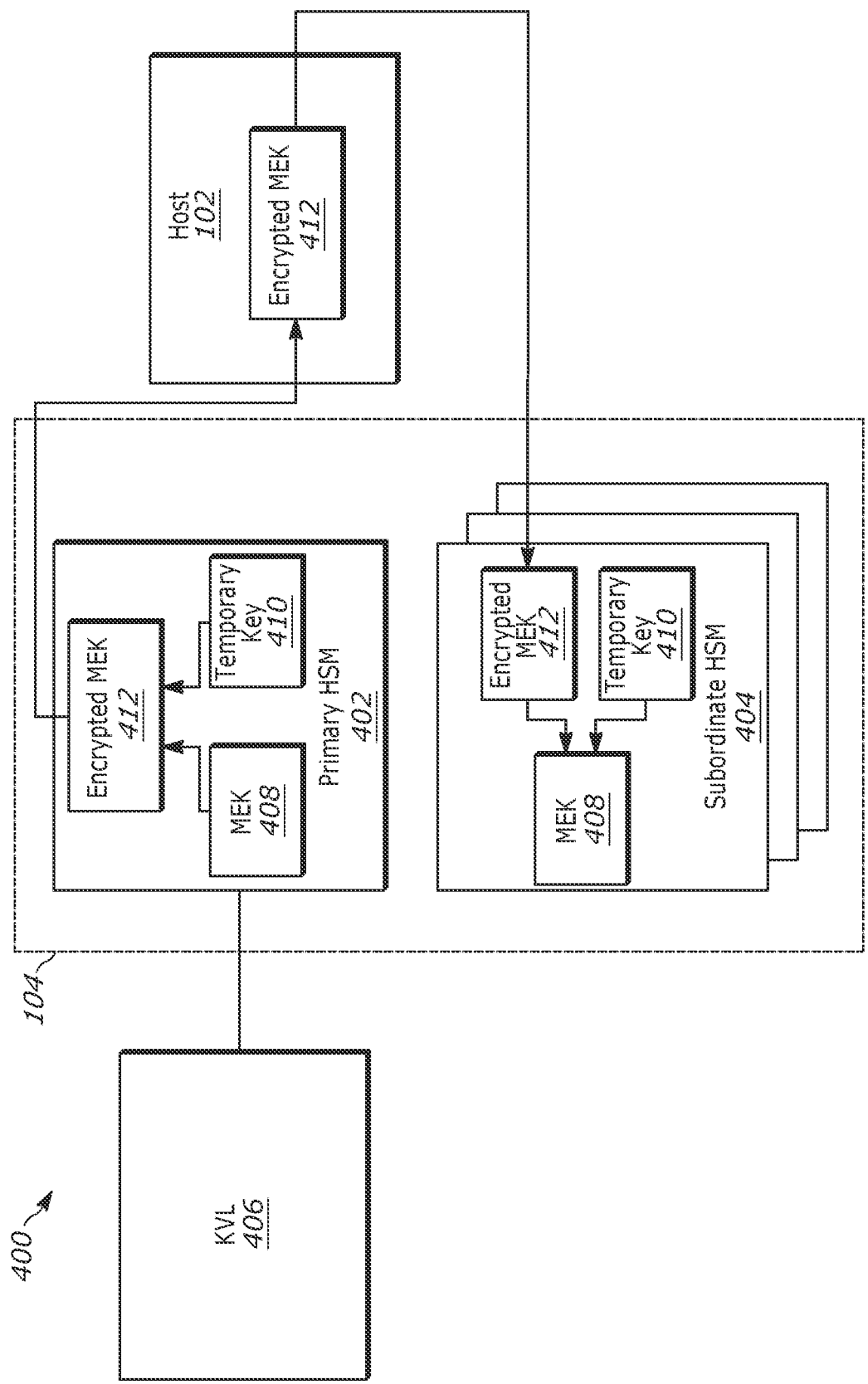
FIG. 4 schematically illustrates a multi-HSM exchange key process, according to some examples.

The primary HSM is configured to only generate and share the MEK with the subordinate HSMs while the system 100 is in a security association mode before the system 100 is provisioned with traffic encryption keys. As an example, FIG. 4 illustrates a MEK establishment diagram 400. In the illustrated example, one of the plurality of HSMs 104 is designated at a primary HSM 402, while the others of the plurality of HSMs 104 are designated as subordinate HSMs 404. A particular one of the HSMs 104 may be designated as a primary HSM 402 based on detection, by the host device 102 and/or the particular one of the plurality of HSMs 104, that the particular one of the HSMs is connected to a key variable loader ("KVL") 406. The KVL 406 is an external key loader operable to provide an HSM with key material, such as, for example, traffic encryption keys. In some instances, the host device 102 designates the primary HSM 402 based on detection that the particular one of the plurality of HSMs 104 is connected to a connection device (e.g., a port, a cable, etc.) that is communicatively connectable to the KVL 406. For example, the host device 102 may detect that a cable is plugged into a particular one of the plurality of HSMs 104, the cable allowing for the connection of the KVL 406 to the particular one of the plurality of HSMs 104. In some instances, the designation of the primary HSM 402 is performed manually based on user selection of a particular HSM 104 as the primary HSM 402 via the user interface 208 of the host device 102.

The primary HSM 402 generates and stores, in non-volatile and/or persistent memory, a multi-HSM exchange key 408, or MEK 408. In order to securely share the MEK 408 with the subordinate HSMs 404 via the host device 102, the plurality of HSMs 104 initiate a key agreement protocol, or key exchange, to generate a temporary key 410 for each subordinate HSM 404. The key agreement protocol may be any suitable key agreement protocol, for example, a Diffie-Hellman ("DH") protocol, elliptic curve Diffie-Hellman ("ECDH") protocol, supersingular isogeny key exchange ("SIKE"), etc. In some instances, the primary HSM 402 authenticates each of the subordinate HSMs 404 prior to or during the key agreement using a digital signature and, optionally, a digital certificate received from each of the subordinate HSMs 404. After a temporary key 410 has been respectively agreed upon between the primary HSM 402 and each of the plurality of subordinate HSMs 404, the primary HSM 402 encrypts the MEK 408 using the temporary key 410. The primary HSM 402 exports an encrypted MEK 412 to the host device 102, which then forwards the encrypted MEK 412 to each of the subordinate HSMs 404. Using the temporary key 410, the subordinate HSMs 404 decrypt the encrypted MEK 412, and store the decrypted MEK 408 in a persistent and/or non-volatile region of its memory 304. In some instances, the MEK 408 is generated by the KVL 406 and manually loaded to each of the plurality of HSMs 104 (e.g., by connecting the KVL 406 to each of the plurality of HSMs 104 one at a time) without using the key agreement protocol.

Figure 5:
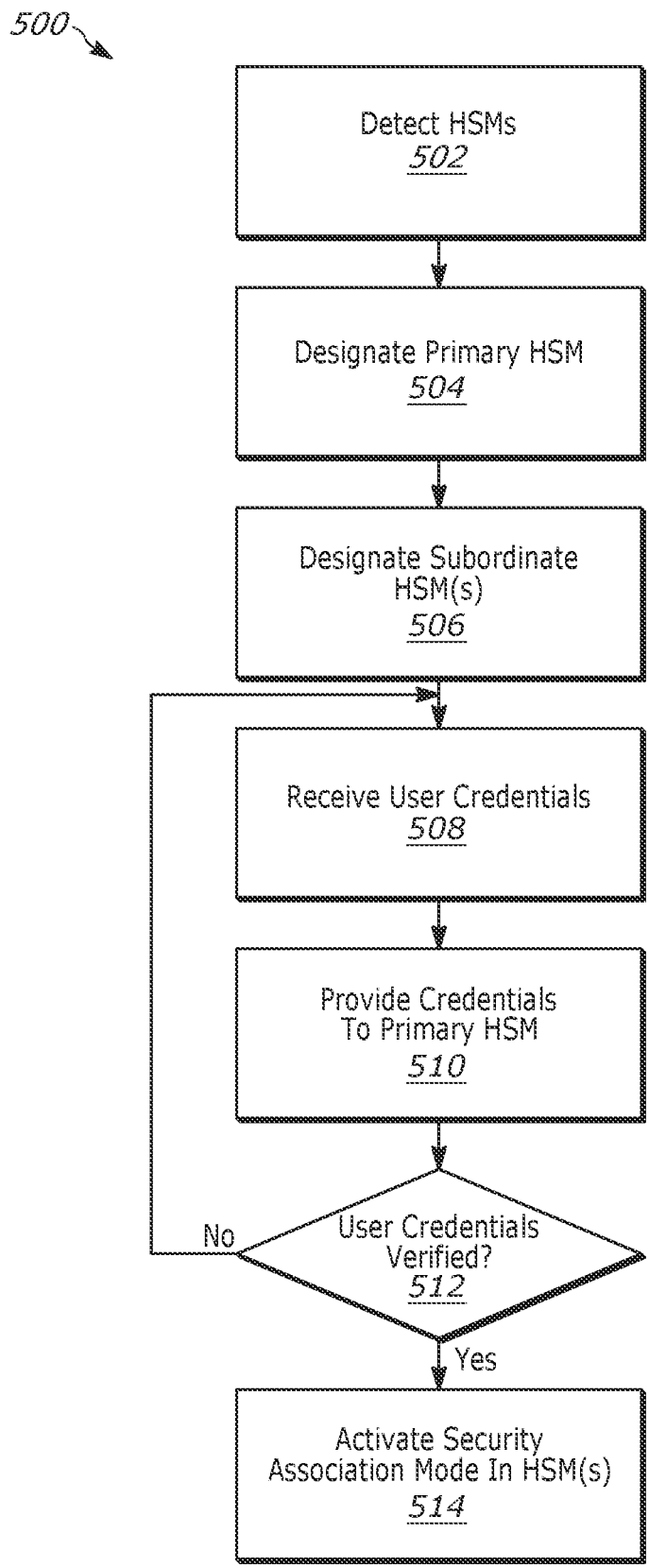
FIG. 5 is a flowchart illustrating a method implemented by the host device for initiating a security association mode, according to some examples.

To facilitate the secure establishment of the MEK 408 shared between the plurality of HSMs 104 before the cryptographic processing session begins, the host device 102 performs an example method 500 for activation of a security association mode ("SAM") in the plurality of HSMs 104 (illustrated in FIG. 5). Although the method 500 is described in conjunction with the system 100 as described herein, the method 500 may be used with other systems and devices. In addition, the method 500 may be modified or performed differently than the specific example provided. As an example, the method 500 is described as being performed by the host device 102 (e.g., using the electronic processor 202, the memory 204, the communication interface 206, the user interface 208, or a combination thereof).

At block 502, the host device 102 detects, via the communication interface 206, each of the plurality of HSMs 104 communicatively connected to the host device 102. At block 504, the host device 102 designates one of the plurality of HSMs 104 as a primary HSM, (e.g., primary HSM 402 illustrated in FIG. 4). For example, the host device 102 designates the primary HSM 402 using any of the methods described above with reference to FIG. 4. At block 506, the host device 102 designates the others of the plurality of HSMs 104 as subordinate HSMs 404. At block 508, the host device 102 receives, via the user interface 208, user credentials from a user (e.g., a username, a password, a verification code, biometric input, or a combination thereof), and at block 510, the host device 102 provides the user credentials to the primary HSM 402. At block 512, the host device 102 receives a verification of the user credentials from the primary HSM 402. In response to the host device 102 receiving the verification from the primary HSM 402 indicating that the user has administrative privileges or is otherwise an authorized user of the system 100, the method 500 proceeds to block 514. In some instances, the host device 102 provides the user credentials to each of the plurality of HSMs 104, and receives a verification from each of the plurality of HSMs 104. At block 514, the host device activates the security association mode in each of the plurality of HSMs 104.

The security association mode, which requires administrative privileges or similar user authority to activate, limits the window of time in which a malicious third party can interfere with and/or eavesdrop on key exchanges (e.g., in a man-in-the-middle attack). For example, stored keys in the system 100 are erased at initiation of the security association mode, and during normal operation, the host device 102 does not store the MEK, and stores only encrypted TEKs rather than the TEKs themselves. Therefore, malware that is installed in the host device 102 after deactivation of the security association mode will not have access to the MEK, and thus will not have access to the messages encrypted on the MEK, for example, the stored encrypted TEKs. When the security association mode is entered again, the TEKs will be erased.

Figure 6:
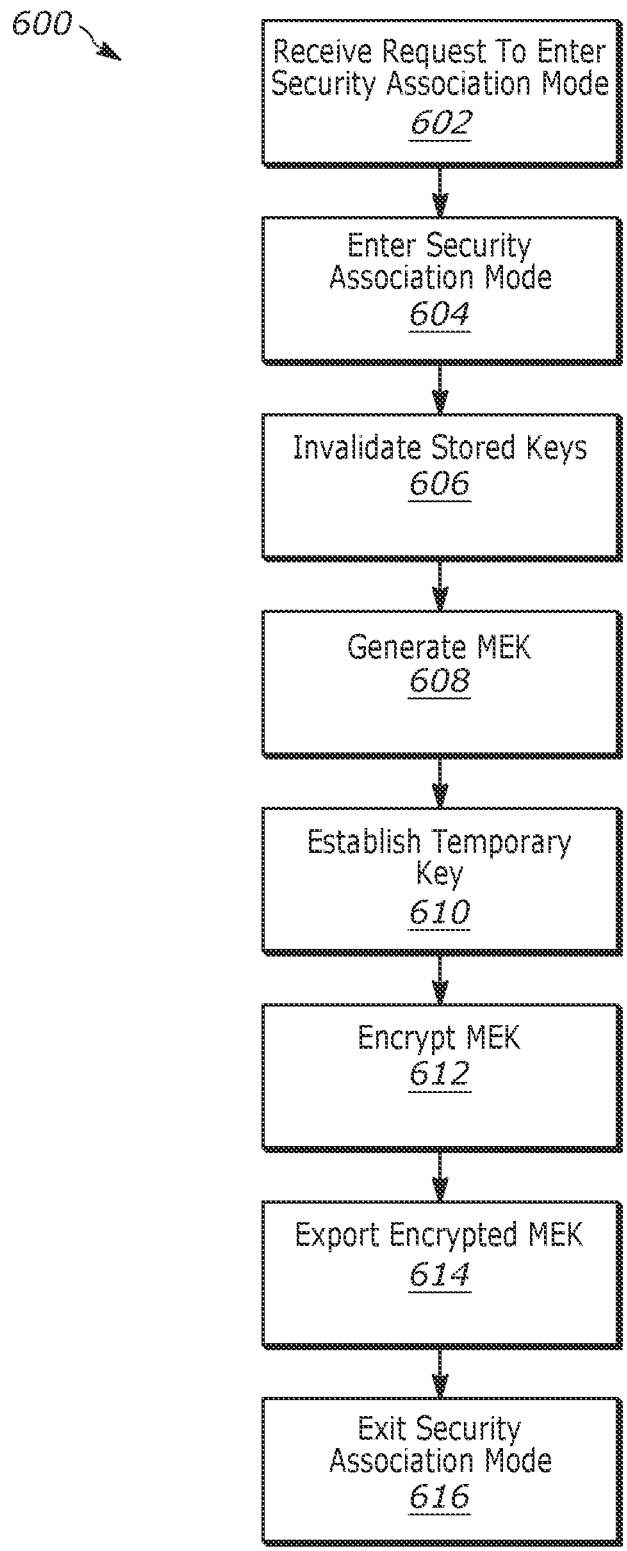
FIG. 6 is a flowchart illustrating a method implemented by a primary hardware security module for generating a multi-HSM exchange key, according to some examples.

FIG. 6 illustrates an example method 600 implemented by the primary HSM 402 (e.g., a first HSM) for entering the security association mode and establishing the MEK 408. The primary HSM 402 implements the method 600 using its respective components, for example, electronic processor 302, the memory 304, the communication interface 306, the user interface 308, or a combination thereof. Although the method 600 is described in conjunction with the system 100 as described herein, the method 600 may be used with other systems and devices. In addition, the method 600 may be modified or performed differently than the specific example provided.

At block 602, the primary HSM 402 receives a request from the host device 102 to enter the security association mode. The request includes, for example, user credentials for use in verifying administrative privileges of the user. When the primary HSM 402 verifies the user's authority to activate the security association mode (e.g., by comparing the received user credentials to one or more values stored in memory 304), the primary HSM 402 enters the security association mode at block 604. At block 606, in response to entering the security association mode, the primary HSM 402 invalidates or erases any keys stored in its memory 304. For example, the primary HSM 402 erases or invalidates a previously stored MEK as well as any TEKs 904. At block 608, after invalidating and/or erasing stored key material, the primary HSM 402 generates the MEK 408 and stores the MEK 408 in its memory 304. At block 610, the primary HSM 402 establishes, with the subordinate HSMs 404, the temporary key 410 using the key agreement protocol. At block 612, the primary HSM 402 encrypts the MEK 408 using the temporary key 410, and, at block 614, the primary HSM 402 exports the encrypted MEK to the host device 102. At block 616, the primary HSM 402 erases or invalidates each temporary key 410 and exits the security association mode. For example, after the host device 102 has shared the encrypted MEK 412 with the subordinate HSMs 404, the primary HSM 402 receives, from the host device 102, a command to exit the security association mode. After the primary HSM 402 has exited the security association mode, the primary HSM 402 inhibits generation of a new MEK until the security association mode is activated again (e.g., using the method 600).

Figure 7:
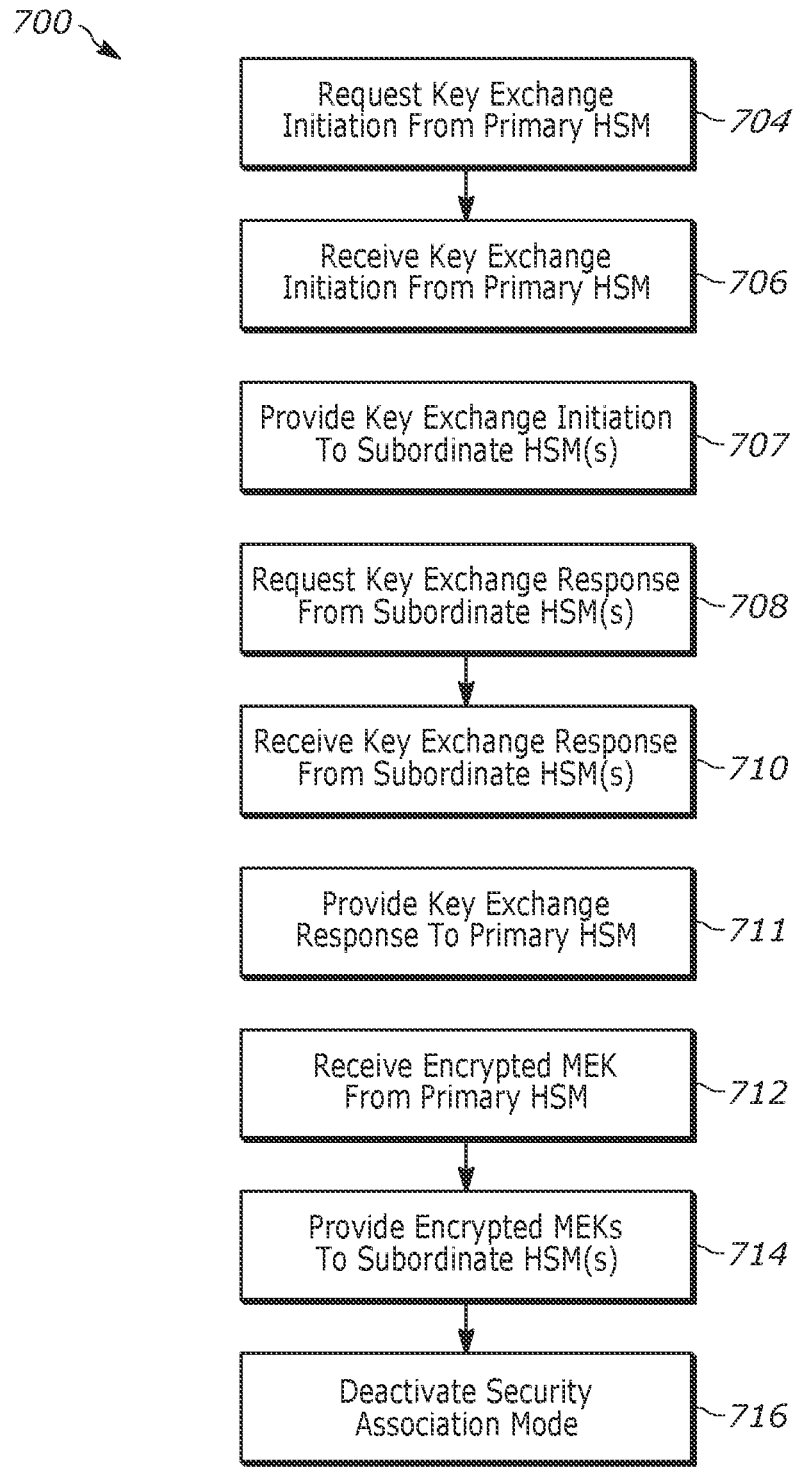
FIG. 7 is a flowchart illustrating a method implemented by the host device for generating a multi-HSM exchange key, according to some examples.

FIG. 7 illustrates an example method 700 implemented by the host device 102 (e.g., using the electronic processor 202, the memory 204, the communication interface 206, the user interface 208, or a combination thereof) for establishing the MEK 408. Although the method 700 is described in conjunction with the system 100 as described herein, the method 700 may be used with other systems and devices. In addition, the method 700 may be modified or performed differently than the specific example provided.

At block 704, while in the security association mode, the host device 102 transmits a request to the primary HSM 402 for key exchange initiation. At block 706, the host device 102 receives, from the primary HSM 402, a key exchange initiation message to initiate the key agreement protocol. In some instances, the key exchange initiation message includes a first digital signature and, optionally, a first digital certificate from the primary HSM 402. At block 707, the host device forwards the key exchange initiation message to each of the subordinate HSMs 404 and, at block 708, requests a key exchange response from each of the subordinate HSMs 404. At block 710, the host device 102 receives a key exchange response from each of the subordinate HSMs 404. The key exchange response from the subordinate HSM 404 may include a second digital signature (e.g., a digital signature generated by the subordinate HSM 404) and, optionally, a second digital certificate (e.g., a digital certificate generated by the subordinate HSM 404), as well as a verification by the subordinate HSM 404 of the first digital signature and, optionally, the first digital certificate. At block 711, the host device 102 forwards the responses to the primary HSM 402. When the key exchange is complete and each of the subordinate HSMs 404 have agreed upon a respective temporary key 410 with the primary HSM 402, the host device 102 receives, at block 712, an encrypted MEK 412 from the primary HSM 402 for each of the subordinate HSMs 404. At block 714, the host device 102 provides an encrypted MEK 412 to each respective one of the subordinate HSMs 404. For example, the host device 102 provides the encrypted MEK 412 encrypted using a particular temporary key 410 to the subordinate HSM 404 which has established, with the primary HSM 402, that particular temporary key 410. Alternatively, the host device 102 receives each encrypted MEK 412 at different times corresponding to the completion of the respective key exchange, and provides the encrypted MEK 412 to the respective subordinate HSM 404 in response to receipt of the respective encrypted MEK 412.

At block 716, after the subordinate HSMs 404 have received a respective encrypted MEK 412, for example after each of the subordinate HSMs 404 have transmitted a notification to the host device 102 indicate receipt of the encrypted MEK 412, the host device 102 deactivates the security association mode in the plurality of HSMs 104.

Figure 8:
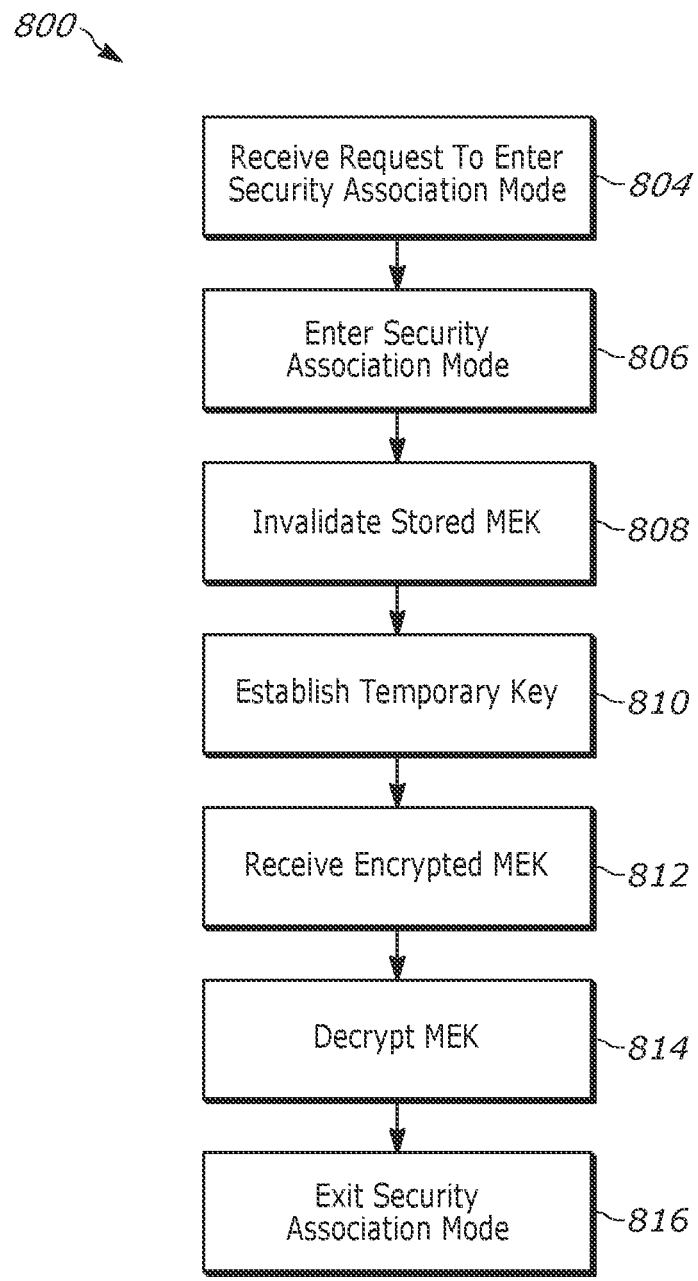
FIG. 8 is a flowchart illustrating a method implemented by a subordinate hardware security module for generating a multi-HSM exchange key, according to some examples.

FIG. 8 illustrates an example method 800 implemented by each of the subordinate HSMs 404 (e.g., a second HSM, a third HSM, etc.) for entering the security association mode and establishing the MEK 408. Each of the subordinate HSMs 404 implement the method 800 using its respective components, for example, electronic processor 302, the memory 304, the communication interface 306, the user interface 308, or a combination thereof. Although the method 800 is described in conjunction with the system 100 as described herein, the method 800 may be used with other systems and devices. In addition, the method 800 may be modified or performed differently than the specific example provided.

At block 804, the subordinate HSM 404 receives a request or command from the host device 102 to enter the security association mode, and at block 806, the subordinate HSM 404 enters the security association mode. In some examples, the subordinate HSM 404 receives and verifies user credentials prior to entering the security association mode. Alternatively, the subordinate HSM 404 may only receive a command from the host device 102 to enter the security association mode once the primary HSM 402 has verified the user credentials. At block 808, in response to entering the security association mode, the subordinate HSM 404 invalidates or erases any keys stored in its memory 304. For example, the subordinate HSM 404 erases or invalidates a previously stored MEK. In some instances, the subordinate HSM 404 stores one or more TEKs 904 (for example, in instances where the subordinate HSM 404 was previously designated as a primary HSM). In such instances, at block 808, the subordinate HSM 404 invalidates or erases any stored TEKs 904 as well as a previously stored MEK. At block 810, the subordinate HSM 404 generates, using the key agreement protocol, a temporary key (e.g., temporary key 410). In some instances, the subordinate HSM 404 authenticates the primary HSM 402 prior to or during the key exchange using a digital signature and, optionally, a digital certificate. For example, as noted above with reference to FIG. 7, the host device 102 may forward the primary HSM digital signature received from the primary HSM 402 to the subordinate HSMs 404. At block 812, after the subordinate HSM 404 has agreed on a temporary key 410 with the primary HSM 402, the subordinate HSM 404 receives, via the host device 102, the encrypted MEK 412 that the primary HSM 402 encrypted using the temporary key 410. At block 814, the subordinate HSM 404 decrypts the encrypted MEK 412, and stores the MEK 408 in its memory 304. At block 816, the subordinate HSM 404 erases or invalidates the temporary key 410 and exits the security association mode, for example, based on a command received from the host device 102.

Figure 9:
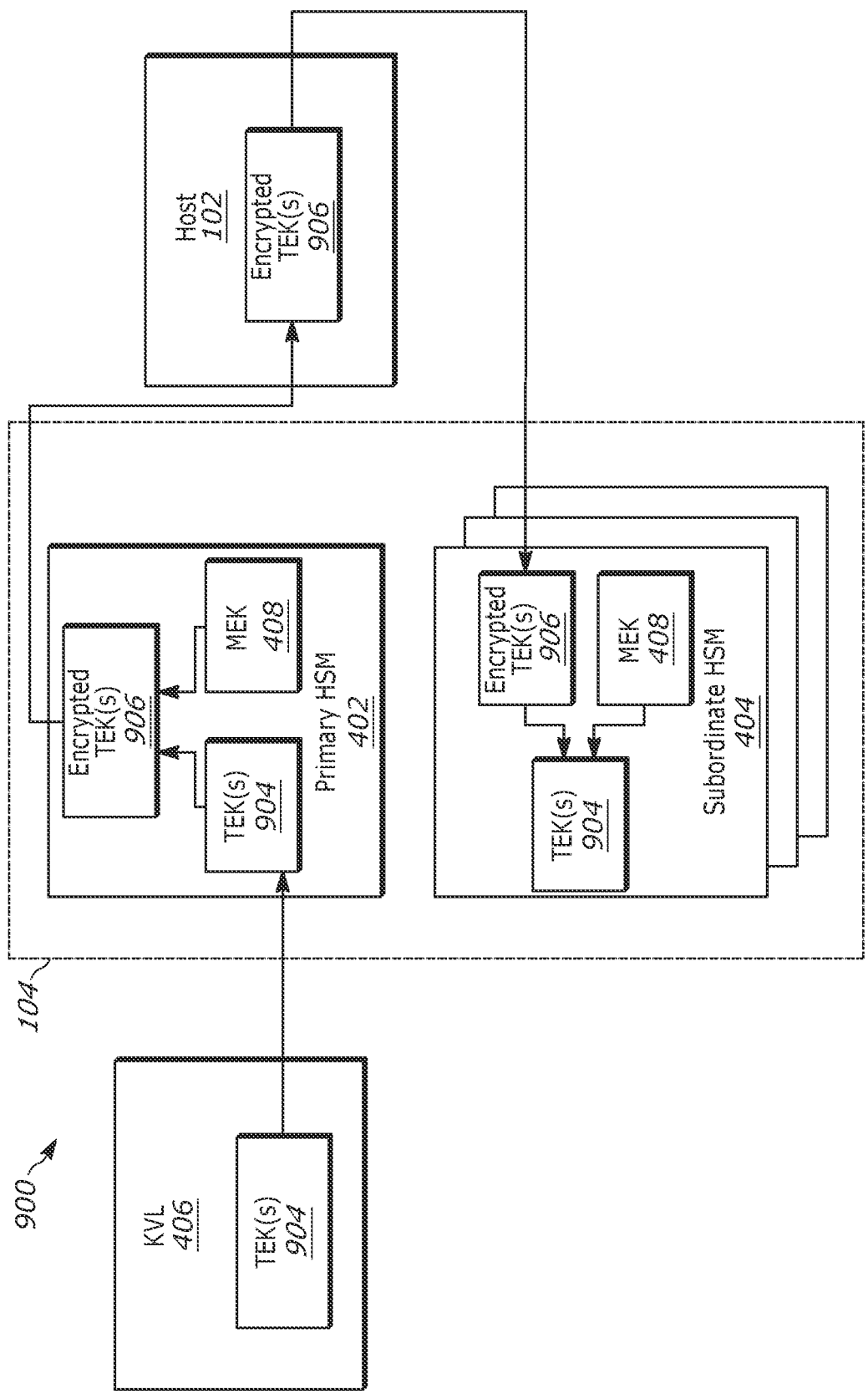
FIG. 9 schematically illustrates a traffic encryption key encryption process, according to some examples.

After the security association mode is deactivated, the primary HSM 402 is operable to provision the subordinate HSMs 404 with traffic encryption keys encrypted using the MEK 408. As an example, FIG. 9 illustrates an example TEK encryption diagram 900. The KVL 406 generates one or more TEKs 904 and provides the one or more TEKs 904 to the primary HSM 402 via the communication interface 306. Alternatively or in addition, one or more TEKs 904 may be manually entered by a user. Alternatively or in addition, the primary HSM 402 may receive one or more TEKs 904 from an upstream key management device in a key management framework (e.g., via over-the-air rekeying). In some instances, the primary HSM 402 receives one or more TEKs 904 to be shared amongst all of the subordinate HSMs 404. Alternatively or in addition, the primary HSM 402 may receive one or more TEKs 904 for each of the subordinate HSMs 404. For example, the primary HSM 402 may receive a first TEK to be shared amongst all of the subordinate HSMs 404, and receive a second TEK to be shared with only a subset of the subordinate HSMs 404, wherein the first TEK and the second TEK are different from each other. Using the multi-HSM exchange key (e.g., MEK 408), the primary HSM 402 encrypts the one or more TEKs 904, and exports encrypted TEKs 906 to the host device 102. The host device 102, which does not have access to the established MEK 408, stores the encrypted TEKs 906 in memory (e.g., memory 204) and transmits one or more of the encrypted TEKs 906 to the subordinate HSMs 404.

In some instances, the host device 102 transmits a first subset of the encrypted TEKs 906 to a first subset of the subordinate HSMs 404, and transmits a second subset of the encrypted TEKs 906 to a second subset of the subordinate HSMs 404, such that each the subordinate HSMs 404 do not receive all of the encrypted TEKs 906. For example, a subordinate HSM 404 may only receive encrypted TEKs 906 associated with talkgroups to which the subordinate HSM 404 is assigned. In some instances, each subordinate HSM 404 only receives one TEK 904. Alternatively, each of the subordinate HSMs 404 may receive all of the encrypted TEKs 906 from the host device 102.

Using the established MEK 408, the subordinate HSMs 404 decrypt the one or more encrypted TEKs 906, and store decrypted TEKs 904 in memory. The subordinate HSMs 404 and the primary HSM 402 may then use the one or more stored TEKs 904 in one or more cryptographic processing sessions. For example, a first subordinate HSM 404 may run a first processing session using a first TEK, a second processing session also using the first TEK 904, and a third processing session using a second TEK. Meanwhile, a second subordinate HSM 404 may run a fourth processing session using the second TEK and a fifth processing session using a third TEK, wherein the first TEK, the second TEK, and the third TEK are each different from each other. Because the host device 102 does not store the MEK 408 used to the decrypt the encrypted TEKs 906, the risk of an attacker accessing the TEKs is reduced.

Figure 10:
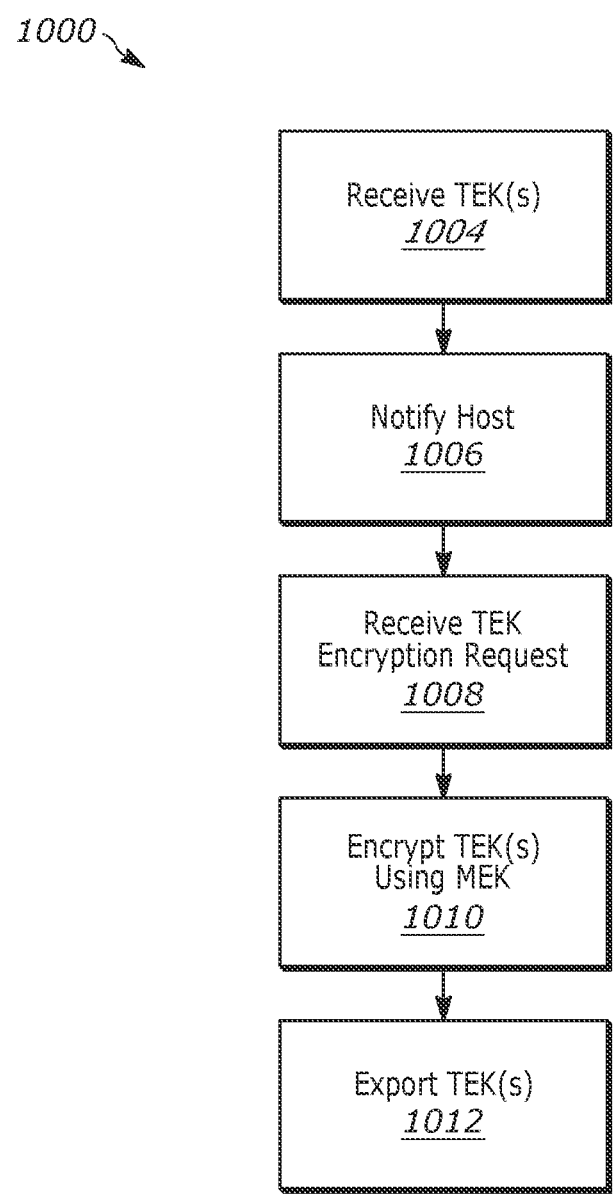
FIG. 10 is a flowchart illustrating a method implemented by the primary hardware security module for sharing a traffic encryption key, according to some examples.

FIG. 10 illustrates an example method 1000 implemented by the primary HSM 402 (e.g., the first HSM) for sharing traffic encryption keys. The primary HSM 402 implements the method 1000 using its respective components, for example, electronic processor 302, the memory 304, the communication interface 306, the user interface 308, or a combination thereof. Although the method 1000 is described in conjunction with the system 100 as described herein, the method 1000 may be used with other systems and devices. In addition, the method 1000 may be modified or performed differently than the specific example provided.

At block 1004, the primary HSM 402 receives one or more traffic encryption keys (e.g., one or more TEKs 904). For example, the primary HSM 402 may periodically request updated TEKs 904 and/or receive a notification that new TEKs 904 are available. The primary HSM 402 may receive the TEKs 904 from the KVL 406 as described above with reference to FIG. 9. Alternatively or in addition, the primary HSM 402 may receive one or more TEKs 904 via over the air rekeying ("OTAR"). For example, after establishment of the MEK 408 and deactivation of the security association mode, the host device 102 may receive and route OTAR messages to the primary HSM 402 for receiving the one or more TEKs 904. Alternatively or in addition, one or more TEKs 904 may be generated by the primary HSM 402 (e.g., using the electronic processor 302 of the primary HSM 402). At block 1006, after receiving the one or more TEKs 904, the primary HSM 402 transmits a notification to the host device 102 to notify the host device 102 of having received the one or more TEKs 904. At block 1008 the primary HSM 402 receives a TEK encryption request from the host device 102. At block 1010, in response to receiving the TEK encryption request, the primary HSM 402 encrypts the one or more TEKs 904 using the MEK 408 stored in its memory 304. At block 1012, the primary HSM 402 provides the one or more encrypted TEKs (e.g., one or more encrypted TEKs 906) to the host device 102.

Figure 11:
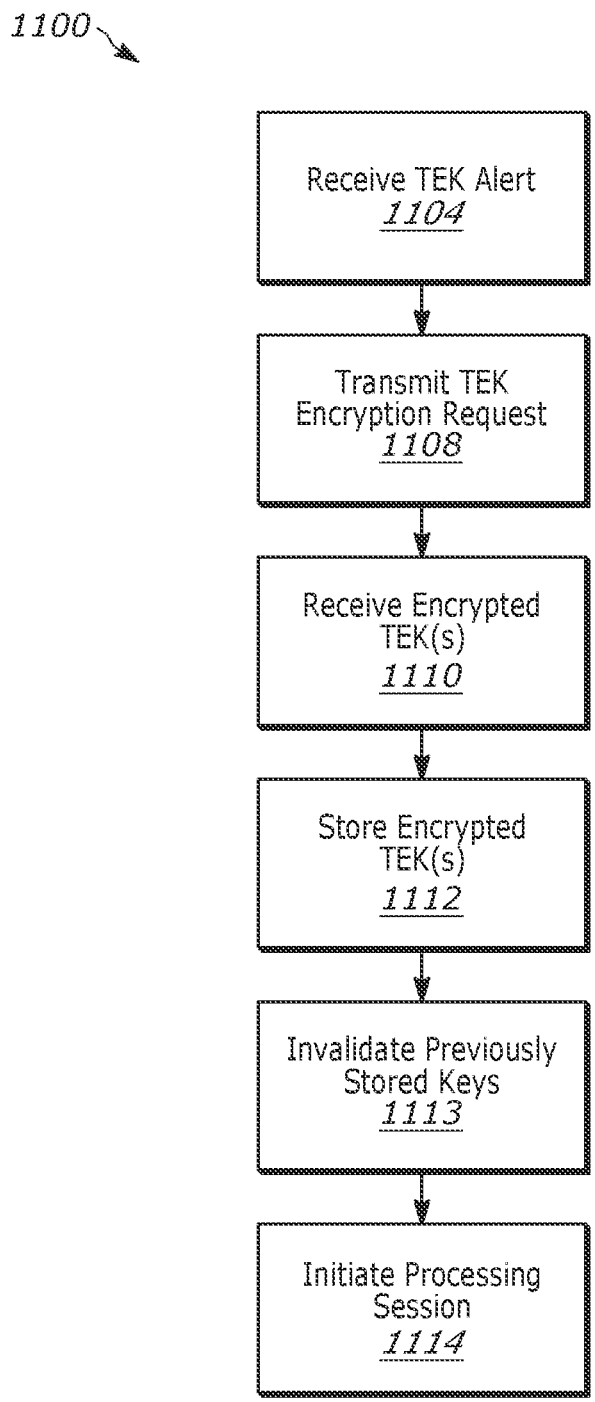
FIG. 11 is a flowchart illustrating a method implemented by the host device for generating a traffic encryption key, according to some examples.

FIG. 11 illustrates an example method 1100 implemented by the host device 102 (e.g., using the electronic processor 202, the memory 204, the communication interface 206, the user interface 208, or a combination thereof) for sharing traffic encryption keys with subordinate HSMs. Although the method 1100 is described in conjunction with the system 100 as described herein, the method 1100 may be used with other systems and devices. In addition, the method 1100 may be modified or performed differently than the specific example provided.

At block 1104, the host device 102 receives an alert from the primary HSM 402 indicating that primary HSM 402 has received one or more TEKs 904. At block 1108, in response to being notified that the primary HSM 402 has received new or updated TEKs 904, the host device 102 transmits a TEK encryption request to the primary HSM 402. At block 1110, the host device 102 receives the one or more encrypted TEKs 906 from the primary HSM 402, and, at block 1112, the host device 102 stores the one or more encrypted TEKs 906 in its memory 204. In instances where the host device previously stored one or more encrypted TEKs in memory 204, the host device 102 receives one or more encrypted updated TEKs 906 at block 1110 and, at block 1112, stores the encrypted updated TEKs 906 in its memory 204. At block 1113, after storing the encrypted updated TEKs 906, the host device erases or invalidates the previously stored encrypted TEKs. For example, the host device 102 erases or invalidates all keys that were stored in memory 204 prior to receiving the updated encrypted TEKs 906. At block 1114, the host device 102 initiates a cryptographic processing session in a particular subordinate HSM 404, for example, by requesting creation of an encryption application context in the particular subordinate HSM 404. In some instances, the host device 102 initiates a cryptographic processing session in more than one subordinate HSM 404.

Figure 12:
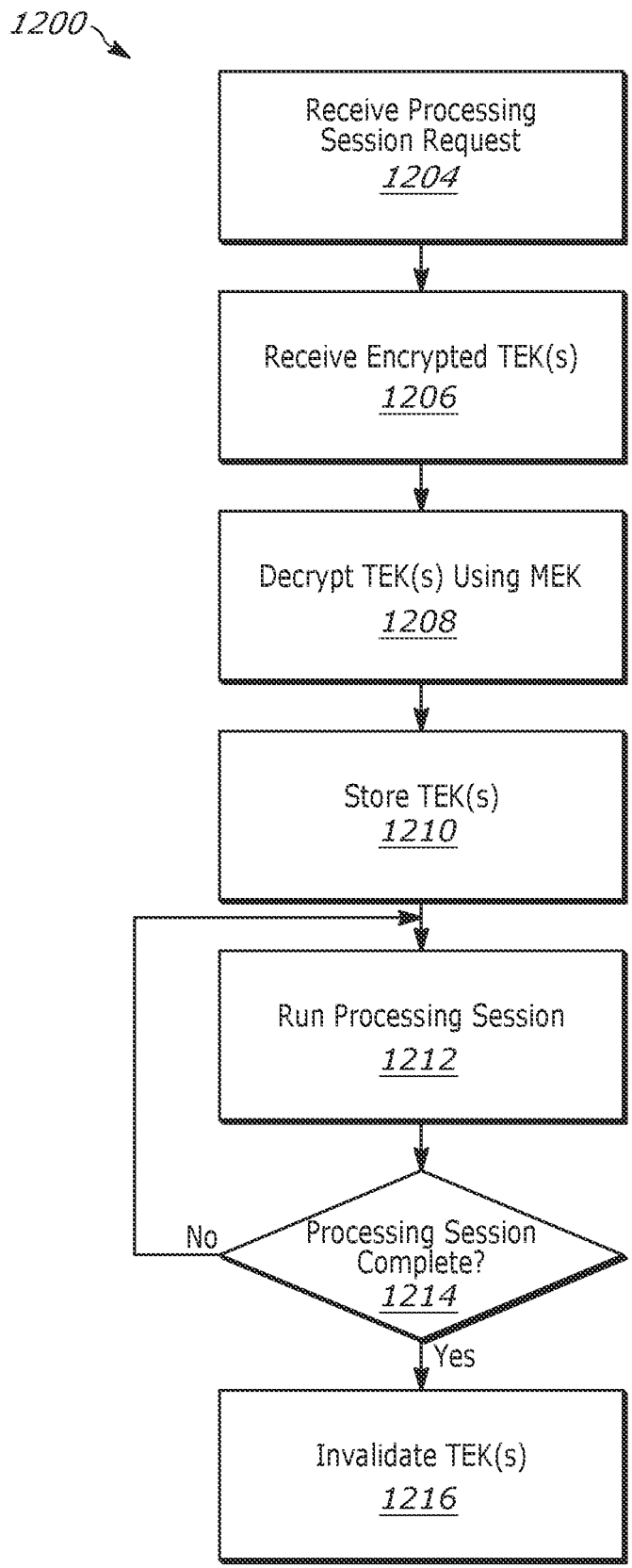
FIG. 12 is a flowchart illustrating a method implemented by the subordinate hardware security module for running a cryptographic processing session, according to some examples.

FIG. 12 illustrates an example method 1200 implemented by one or more of the subordinate HSMs 404 (e.g., the second HSM, the third HSM, etc.) for running a cryptographic processing session. Each of the subordinate HSMs 404 implement the method 1200 using its respective components, for example, electronic processor 302, the memory 304, the communication interface 306, the user interface 308, or a combination thereof. Although the method 1200 is described in conjunction with the system 100 as described herein, the method 1200 may be used with other systems and devices. In addition, the method 1200 may be modified or performed differently than the specific example provided.

At block 1204, the subordinate HSM 404 receives, from the host device 102, the request for creation of an encryption application context. At block 1206, the subordinate HSM 404 receives at least one encrypted TEK 906 from the host device 102. At block 1208, the subordinate HSM 404 decrypts the at least one encrypted TEK 906, and, at block 1210 stores the at least one decrypted TEK 904 in its memory 304. At block 1212, the subordinate HSM 404 creates an encryption application context for each received TEK 904, attaches a respective TEK 904 to the application context, and begins running one or more cryptographic processing sessions. When a cryptographic processing session is complete at block 1214 (e.g., when the subordinate HSM 404 receives a notification from the host device 102 indicating that a new encrypted TEK is available, that the MEK has changed, or that the processing session is otherwise complete), the subordinate HSM 404 invalidates or erases the respective TEK 904 stored in its memory 304 (at block 1216).

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for securely managing a plurality of hardware security modules (HSMs) each including a memory and an electronic processor, the system comprising:
   a first HSM;
   a second HSM; and
   a host device including a host memory and an electronic processor configured to
      designate the first HSM as a primary HSM,
      designate the second HSM as a subordinate HSM, and
      activate a security association mode;
   wherein the first HSM is configured to
      in response to the security association mode being activated, generate a multi-HSM exchange key,
      using a temporary key generated with a key agreement protocol between the first HSM and the second HSM, encrypt the multi-HSM exchange key using the temporary key, and
   share an encrypted multi-HSM exchange key with the second HSM via the host device;
   wherein the host device is further configured to
      in response to the first HSM sharing the encrypted multi-HSM exchange key with the second HSM, deactivate the security association mode;
   wherein the first HSM is further configured to
      receive a traffic encryption key (TEK), and
   in response to receiving the TEK, notify the host device of having received the TEK;
   wherein the host device is further configured to
      transmit a request to the first HSM to encrypt the TEK using the multi-HSM exchange key,
   receive an encrypted TEK from the first HSM,
   store the encrypted TEK in the host memory, and
      provide the encrypted TEK to the second HSM;
   wherein the second HSM is configured to
      invalidate or erase the TEK upon completion of a processing session.

2. The system of claim 1, wherein the second HSM is configured to in response to receiving the encrypted multi-HSM exchange key, decrypt the multi-HSM exchange key with the temporary key,
store the multi-HSM exchange key in the memory of the second HSM, and
in response to receiving the encrypted TEK from the host device, decrypt the encrypted TEK using the multi-HSM exchange key stored in the memory of the second HSM.

3. The system of claim 1, further comprising
a third HSM; wherein
the host device is configured to designate the third HSM as another subordinate HSM, and
the first HSM is configured to share the encrypted multi-HSM exchange key with the second HSM and the third HSM.

4. The system of claim 1, wherein
the second HSM is further configured to authenticate the first HSM using at least one selected from the group consisting of a first digital signature from the first HSM and a first digital certificate from the first HSM, and
the first HSM is further configured to authenticate the second HSM using at least one selected from the group consisting of a second digital signature from the second HSM and a second digital certificate from the second HSM.

5. The system of claim 1, wherein the host device includes a user interface and is configured to activate the security association mode by
receiving user credentials from a user via the user interface,
providing the user credentials to the first HSM, and
in response to receiving a verification from the first HSM indicating that the user has administrative privileges, activate the security association mode.

6. The system of claim 1, wherein the first HSM is further configured to
in response to activating the security association mode, erase or invalidate all keys stored in the memory of the first HSM.

7. The system of claim 1, wherein the first HSM is further configured to in response to deactivating the security association mode, inhibit generation of subsequent multi-HSM exchange keys by the first HSM.

8. The system of claim 1, wherein
the first HSM is further configured to
receive an updated TEK,
encrypt the updated TEK with the multi-HSM exchange key, and
export an encrypted updated TEK to the host device;
the host device is further configured to
in response to receiving the encrypted updated TEK, store the encrypted updated TEK in host memory, and
erase or invalidate all keys that were stored in host memory prior to receiving the encrypted updated TEK.

9. The system of claim 1, wherein the host device further includes a user interface and is configured to designate the first HSM as the primary HSM based on at least one selected from the group consisting of detecting that the first HSM is connected to a connection device connectable to an external key loader and detecting user selection of the first HSM via the user interface.

10. A primary hardware security module (HSM) used in a system for securely managing a plurality of HSMs, the primary HSM comprising:
a memory; and
an electronic processor configured to
in response to receiving a request from a host device to enter a security association mode, enter the security association mode,
in response to receiving a request from the host device to generate a multi-HSM exchange key while in the security association mode, generate the multi-HSM exchange key,
using a temporary key generated using a key agreement protocol, encrypt the multi-HSM exchange key, and share an encrypted multi-HSM exchange key with a subordinate HSM via the host device,
receive a traffic encryption key (TEK),
encrypt the TEK with the multi-HSM exchange key, and
export an encrypted TEK to the host device.

11. The primary HSM of claim 10, wherein the electronic processor is further configured to
receive an updated TEK,
notify the host device, upon request, of having received the updated TEK,
encrypt the updated TEK with the multi-HSM exchange key, and
upon in response to receiving a request from the host device an encrypted updated TEK, export the encrypted updated TEK to the host device.

12. The primary HSM of claim 10, wherein the electronic processor is further configured to share the encrypted multi-HSM exchange key with a plurality of subordinate HSMs via the host device.

13. A host device used in a system for securely managing a plurality of hardware security modules (HSMs), the host device comprising:
a memory; and
an electronic processor configured to
designate a first HSM as a primary HSM,
designate a second HSM as a subordinate HSM,
activate a security association mode in the first HSM,
receive an encrypted multi-HSM exchange key,
provide the encrypted multi-HSM exchange key to the subordinate HSM,
deactivate the security association mode in the first HSM,
receive an encrypted traffic encryption key (TEK) from the first HSM, the encrypted TEK being encrypted with the multi-HSM exchange key,
store the encrypted TEK in the memory, and
provide the encrypted TEK to the second HSM.

14. The host device of claim 13, wherein the electronic processor is further configured to
designate a third HSM as another subordinate HSM, and
provide the encrypted multi-HSM exchange key to the third HSM.

15. The host device of claim 13, further comprising
a user interface; wherein
the electronic processor is further configured to activate the security association mode by
receiving user credentials from a user via the user interface,
providing the user credentials to the first HSM, and
in response to receiving a verification from the first HSM indicating that the user has administrative privileges, activate the security association mode in the first HSM.

16. The host device of claim 13, wherein the electronic processor is further configured to, in response to activating the security association mode, erase or invalidate all keys stored in the memory.

17. The host device of claim 13, wherein the electronic processor is further configured to, in response to deactivating the security association mode, inhibit generation of subsequent multi-HSM exchange keys by the first HSM.

18. The host device of claim 13, wherein the electronic processor is further configured to
receive an encrypted updated TEK from the first HSM,
in response to receiving the encrypted updated TEK, store the encrypted updated TEK in host memory, and
erase all keys stored in host memory prior to receiving the encrypted updated TEK.

19. The host device of claim 13, further comprising
a user interface; wherein
the electronic processor is configured to designate the first HSM as the primary HSM based on at least one selected from the group consisting of detecting that the first HSM is connected to a connection device connectable to an external key loader, or detecting user selection of the first HSM via the user interface.

20. A method for securely managing a plurality of hardware security modules (HSMs) each including a memory and an electronic processor, the method comprising:
designating, with a host device, a first HSM as a primary HSM;
designating, with the host device, a second HSM as a subordinate HSM;
activating, with the host device, a security association mode;
in response to the security association mode being activated, generating, with the first HSM, a multi-HSM exchange key;
generating a temporary key using a key agreement protocol between the first HSM and the second HSM;
encrypting, with the first HSM, the multi-HSM exchange key using the temporary key;
sharing, with the first HSM, the encrypted multi-HSM exchange key with the second HSM via the host device;
in response to sharing, with the first HSM, the encrypted multi-HSM exchange key with the second HSM, deactivating the security association mode;
receiving, with the first HSM, a traffic encryption key (TEK);
in response to receiving the TEK, notifying, with the first HSM, the host device of having received the TEK;
transmitting, with the host device, a request to the first HSM to encrypt the TEK using the multi-HSM exchange key;
receiving, with the host device, an encrypted TEK from the first HSM;
storing, with the host device, the encrypted TEK in a host memory;
providing, with the host device, the encrypted TEK to the second HSM; and
invalidating or erasing, with the second HSM, the TEK upon completion of a processing session.

\* \* \* \* \*